July 18, 1950 L. L. JONES ET AL 2,515,230
APPARATUS FOR ELECTRIC WELDING SEAM PORTIONS
OF ELECTRICALLY CONDUCTING ARTICLES
Filed Oct. 29, 1946 4 Sheets-Sheet 4

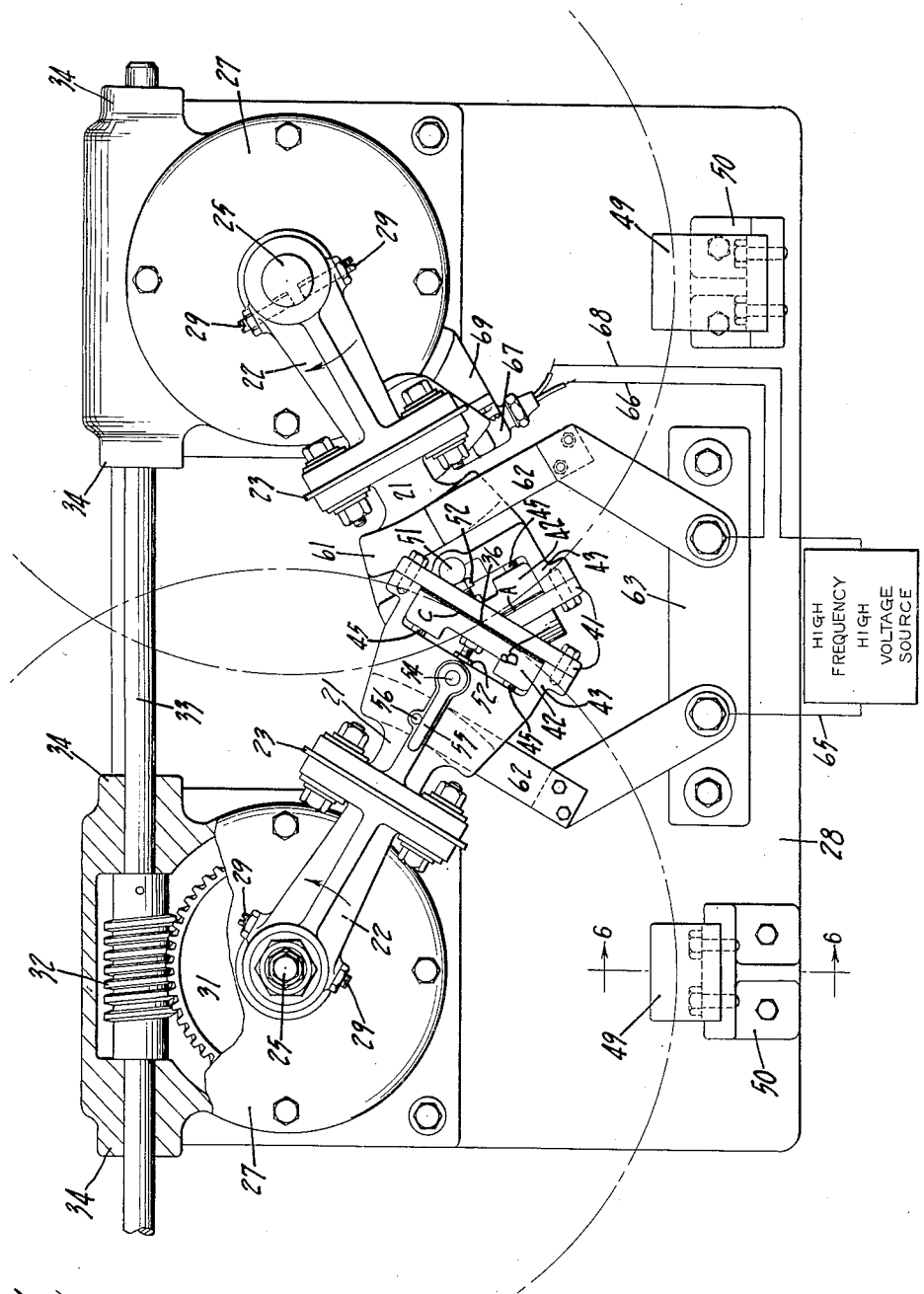

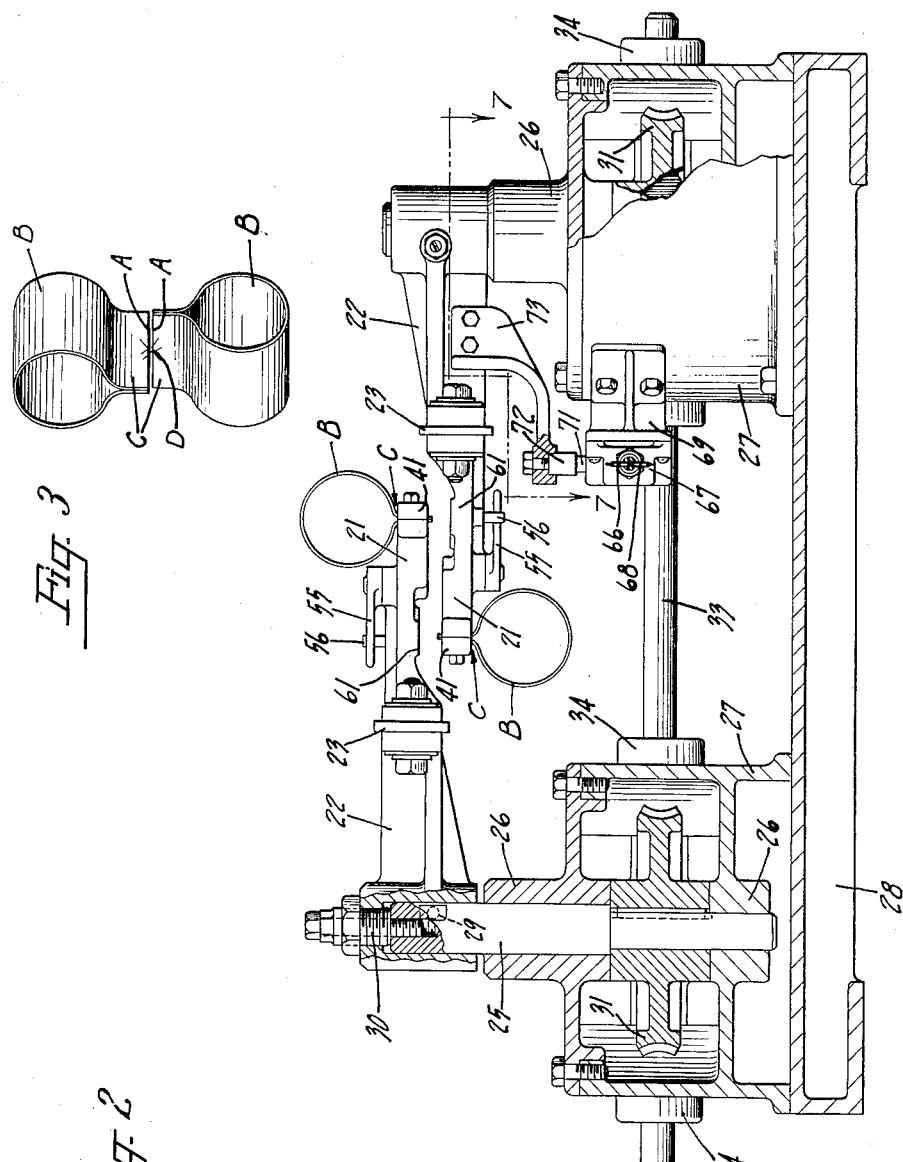

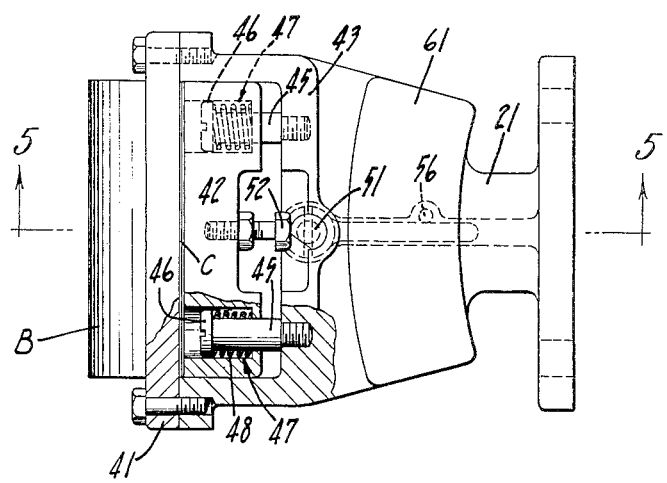
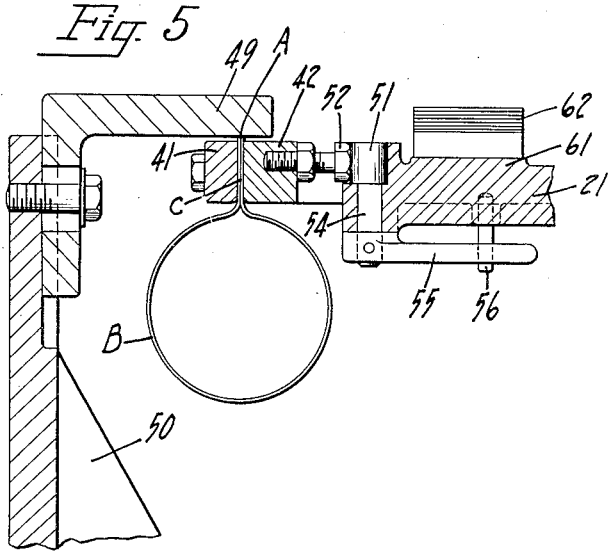
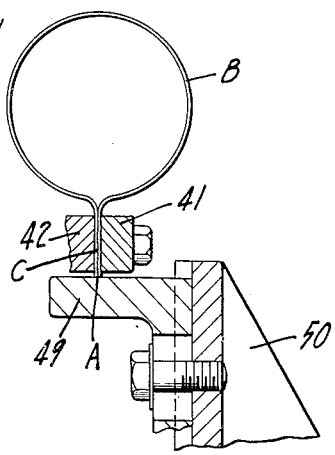

INVENTORS
Lyman L. Jones
George R. Barger
BY Ivan D. Thornburgh
Charles H. Erne
ATTORNEYS Patented July 18, 1950

2,515,230

UNITED STATES PATENT OFFICE 2,515,230

APPARATUS FOR ELECTRIC WELDING SEAM PORTIONS OF ELECTRICALLY CONDUCTING ARTICLES

Lyman L. Jones and George K. Barger, Seattle, Wash., assignors to American Can Company, New York, N. Y., a corporation of New Jersey Application October 29, 1946, Serial No. 706,483

8 Claims. (Cl. 219—6)

The present invention relates to a machine for welding articles and has particular reference to mechanism for welding two articles simultaneously while utilizing the articles as electrodes. An application covering steps in a method of welding two articles simultaneously while using the articles as electrodes is embodied in an application of Lyman L. Jones, Serial No. 706,481, filed October 29, 1946, simultaneously with the filing of the present application, and matured into Patent No. 2,452,574 on November 2, 1948.

An object of the invention is the provision of a welding machine wherein an electric welding current is passed from one article to another so that both articles will be separately welded thereby producing simultaneously two separate and independent welded articles.

Another object is the provision of such a welding machine wherein the separate welding of the two independent articles is effected by an electric arc established between the articles to be welded, the articles being utilized as electrodes so that the ends of the arc disposed between them terminate on the articles and thereby independently heat both articles to a welding temperature to produce simultaneously two separate and independent welded articles.

Another object is the provision of such a welding machine wherein articles having long seams to be separately welded are moved relative to one another during the welding operation so that the seam portions of the articles are progressively welded while the electric arc remains in space relatively stationary.

Another object is the provision of such a welding machine wherein the articles to be separately welded are retained in movable devices which propel the articles along spaced, intersecting, projected paths of travel for the welding operation.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a machine embodying the instant invention, with parts broken away;

Fig. 2 is a longitudinal section of the machine illustrated in Fig. 1 with certain of the movable parts in a different position;

Fig. 3 is a schematic view illustrating a pair of can bodies in relative position assumed during the welding operation;

Fig. 4 is an enlarged top plan view of one of the welding heads used in the machine, with parts broken away;

Fig. 5 is a sectional view taken substantially along the line 5—5 in Fig. 4, with parts broken away and with parts added;

Fig. 6 is a view similar to Fig. 5 taken substantially along the line 6—6 in Fig. 1 and drawn to the same scale as Fig. 5, showing the gauging device for the opposing can body;

Figure 7:
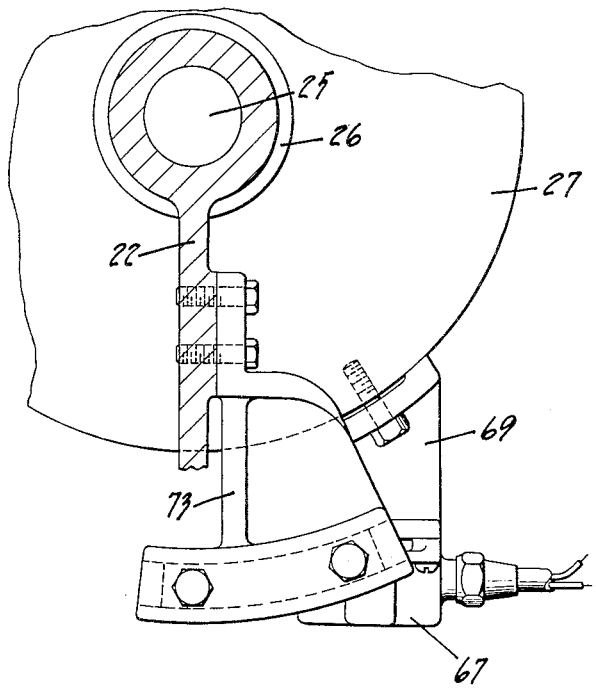
Fig. 7 is an enlarged sectional view taken substantially along the broken line 7—7 in Fig. 2, with parts broken away.

As a preferred embodiment of the instant invention the drawings illustrate a machine for welding the side seam edges A (Fig. 3) of partially formed sheet metal tubular container or can bodies B. The can bodies are prepared for the seam welding operation by having marginal edge portions C bent outwardly at right angles to the body and pressed flat against each other for the full length of the bodies. This arranges the side seam edges A in parallel and adjacent positions.

When the side seam edges of two such can bodies have thus been prepared, these seam edges are clamped in position adjacent and opposite each other. This may be done by placing the bodies in horizontal positions one above the other with their seam edges facing each other, as shown in Fig. 3. The can bodies are then moved relative to each other each along a horizontally disposed curved path of travel. There are thus two curved paths of travel, one for each body, and they are arranged so that vertically projected portions of these paths of travel intersect or cross each other. The bodies are moved in synchronism so that they will come adjacent each other during the time they simultaneously pass through a given place of intersection of their projected paths of travel.

As the two bodies, moving through their curved paths of travel in two different planes one above the other, come into the region of the projected intersecting paths of travel, the leading edges of the side seam portions of the bodies come into alignment momentarily. At this moment an electric arc D (Fig. 3) is established between the seam edges of the two moving bodies. The arc is struck by the passage of an electric welding current from the seam edges of one body to the nearest seam edges of the other body, the ends of the arc terminating in the edges of both bodies. The bodies thus form their own electrodes.

As the bodies continue along their paths of travel, other adjoining sections of the side seam edges progressively cross each other while the arc remains fixed in space at the point of intersection. The welding heat of the electric arc thus progresses along the clamped seam edges A of both bodies simultaneously and progressively reduces the seam edges of each body to a fluid or plastic condition. The fluid metal of the two clamped edges of one body immediately flows together or merges into a single nodule or mass and upon cooling welds together these two edges in an improved welded can body. The same action takes place in the clamped seam edges of the second or cooperating can body. Hence the side seam edges of both can bodies are separately but simultaneously operated upon with the result that two separate and independent welded bodies are simultaneously produced.

Preferably, the seam edges A of the one body during such welding are brought into engagement with the seam edges of the second or cooperating body and the two seams are rubbed along each other as the bodies move through the projected intersecting portions of their respective paths of travel. Excellent results, however, have been obtained when the seams of the two bodies have been maintained in slightly spaced relation. In some cases and for certain can bodies this separated condition is preferred.

As the moving bodies pass beyond the region of the projected intersecting portions of their paths of travel, the electric welding current is cut off and the arc D is thereby extinguished. This completes the welding operation.

In the machine the can bodies B to be welded are clamped in a pair of support heads 21 (Fig. 1). Heads 21 are bolted to a pair of horizontally rotatable support arms 22 and are insulated therefrom by intervening electric insulating pads 23. The opposite ends of the support arms are mounted on the upper ends of a pair of spaced and parallel vertical actuating shafts 25 (see also Fig. 2). These two shafts are journaled in bearings 26 formed in a pair of spaced housings 27 carried on a common base plate 28.

Each of the arms may be rotatively adjusted on its shaft 25 to insure the desired meeting of the seam edges of the two bodies at the beginning of the welding operation. This adjustment is brought about by manipulation of adjusting screws 29 (Fig. 1) which are carried in the arms and which engage against ears on the shafts. One of the arms, on the left as viewed in Figs. 1 and 2, is also vertically adjustable for controlling the space between the seam edges of the two bodies for the welding operation. This adjustment is effected by a threaded sleeve 30 carried in the end of the arm. By rotating the sleeve the arm may be raised or lowered on the shaft. The sleeve is held against vertical displacement by a bolt which is threadedly engaged in the upper end of the shaft.

The actuating shafts 25 are rotated in opposite directions by worm wheels 31 disposed in the housings 27 and carried on the shafts intermediate their bearings 26. These worm wheels are driven by a pair of worms 32 mounted on a drive shaft 33 journaled in bearings 34 formed on the housings 27. The drive shaft may be rotated in any suitable manner.

Hence as the worm wheels 31 rotate the actuating shafts 25 in opposite directions, as indicated by the arrows in Fig. 1, the support arms 22 mounted thereon carry the support heads 21 along their respective curved paths of travel. One of the support arms is disposed in a plane above the other so that as the arms rotate projections of their paths of travel will intersect and cross each other at a welding station, designated by the numeral 36 (Fig. 1). The actuating shafts 25 are spaced apart a distance sufficient to permit this intersection.

Each of the support heads 21 is arranged to support one can body B and to clamp its side seam edge portions C tightly together. For this purpose each support head 21 is formed with a fixed jaw 41 (Figs. 4 and 5) and a movable jaw 42. The fixed jaw 41 is bolted at its ends to the ends of a horizontally disposed U-shaped member or retainer 43 formed integrally with the support head at its outer end.

The movable jaw 42 is interposed between the fixed jaw 41 and the U-shaped member 43 and is slidably carried on the shanks of two shoulder screws 45 threadedly secured in the retainer. These screws are provided with heads 46 located in recesses 47 formed in the movable jaw. Compression springs 48 interposed between the screw heads 46 and movable jaw 42 tend to keep the movable jaw in a separated relation to the fixed jaw 41 so that the seam portions C of a can body B can be readily inserted between the jaws. The insertion of the body in place in the support head preferably is effected manually.

When a can body has been placed in position in its support head 21, the side seam edges A of the body are brought into engagement with a locating gauge 49 (Figs. 5 and 6) for locating the edges at a predetermined elevation. This determines the space between the edges of the two bodies. There is one of these gauges for each support head 21. These gauges are adjustably mounted on stationary brackets 50 bolted to the base plate 28.

When the seam edges are properly located in the support heads the movable jaw 42 in the heads is shifted toward the fixed jaw to clamp the seam portions C of the body tightly between them. This clamping action is brought about by a rotatable cam 51 which operates against the head of an adjustable actuating screw 52 threadedly secured in the movable jaw. The cam is formed on one end of a stem 54 carried in the support head 21. The stem and its cam are rotated manually into jaw closing position by a handle 55 which is mounted on the opposite end of the stem. A stop pin 56 secured in the support head is provided for engagement by the handle to arrest its further movement and to insure that the jaw is fully closed.

The electric welding current for the welding operation is transmitted to the side seam edges A of the positioned and clamped can bodies B, through the support heads 21. For this purpose each of the support heads is formed with a contact shoe 61 (Figs. 4 and 5). These contact shoes, during the rotation of the support heads 21 in their curved paths of travel, engage against and ride along fixed brushes 62 (Fig. 1). Brushes 62 are secured to an electric insulating block 63 mounted on the base plate 28. Thus there is a brush for each support head and both brushes are located adjacent the welding station 36. Thus it will be seen that electrical contact between the brushes and the shoes is made only during the welding operation.

Figure 8:
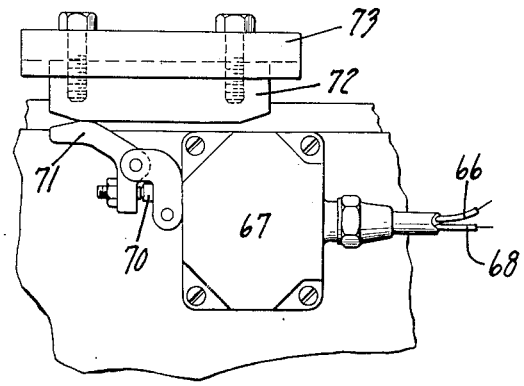
Fig. 8 is a side elevation of the parts shown in Fig. 7.

One brush 62 carried on a brush holder secured to the insulation block 63 is connected by way of a lead wire 65 to a source of high frequency high voltage electric current as indicated in Fig. 1. The other brush is connected by a lead wire 66 to a normally open control switch 67 (see also Fig. 8). This switch in turn is connected by a wire 68 to the source of electric current.

The control switch 67 is secured to a bracket 69 (Fig. 2) bolted to one of the housings 27 and is provided with a movable actuating element 70. This element is operated by a finger 71 (Figs. 7 and 8) pivotally mounted on the switch casing. The finger is engaged and actuated by a timing cam 72 adjustably mounted on a cam arm 73 bolted to the support arm 22. It is adapted to pass adjacent the switch 67. Thus the cam rotates with the support arm while the switch remains in a fixed position. The position of the switch is fixed in relation to the welding station 36 so that the switch will be closed by the cam just as the leading edges of the seam portions of the bodies in the support heads 21 enter the welding station.

In operation, the two can bodies B to be welded are clamped in position in the support heads 21 while the machine is idle and when the heads are in can body receiving position removed from the welding station 36. With the bodies in place in the heads, the machine is started and the support arms 22 with the bodies carried thereon move through their curved paths of travel.

During this travel and as the two bodies simultaneously enter the welding station, the contact shoes 61 of the support heads engage the brushes 62 and the timing cam 72 engages the switch actuating finger 71 and this finger closes the switch. With the switch closed electric current from the high frequency, high voltage source is transmitted to one of the brushes 62, its contact shoe 61 and head 21 to the side seam edges A of the can body B clamped in the head.

The body acts as an electrode and transmits the electric current to the side seam edges A of the opposing body B when these edges come into intersecting alignment the current jumping across the space from one body to the other when the spaced condition is used. The current received in the opposing body B is carried by its head 21, contact shoe 61 and brush 62 back to the source, thus completing its circuit. It is this electric current that establishes the welding arc D between the seam edges A of the body as hereinbefore mentioned.

The timing cam 72 holds the switch 67 closed as long as the seam edges A of the moving bodies are in intersecting relation. This maintains the electric arc D until the full length of the seam edges A of both bodies have passed through the arc. It is this maintenance of the arc that welds the seam edges of both bodies along their entire lengths.

At the terminal ends of the side seam edges A of the moving bodies and immediately as these terminal ends pass out of intersecting relation just beyond the welding station, the electric arc D is extinguished. This is brought about by the passing of the seam edges out of intersecting relationship. This terminates the welding cycle and the timing cam thereupon rides off the actuating finger 71 of the switch 67. This releases the finger and opens the switch. The electric circuit is thereby broken.

The immediate breaking of the circuit is brought about so as to prevent any re-establishment of the arc D during the second crossing of the projected paths of travel of the can bodies as they move toward each other again beyond the welding station and just before they travel away from each other toward their starting points. Upon completion of the welding cycle the machine is stopped and the two separate and independent welded can bodies are removed from the support heads 21. This completes the cycle of operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for welding the side seam edges of tubular sheet metal can bodies, the combination of a pair of movable support heads disposed in spaced relation for holding a pair of can bodies in opposed positions with their side seam edges extending toward each other when said heads are in predetermined positions, actuating means for moving said support heads along separate paths of travel to progressively advance portions of the side seam edges of each body through a projected point of intersection of said paths of travel, and electric means for directly welding said side seam edges of the two bodies by passing a welding current through the bodies as corresponding seam portions pass through the projected point of intersection of the paths of travel of said heads for simultaneously welding the seam edges of both bodies.

2. In a machine for welding the side seam edges of tubular sheet metal can bodies, the combination of a pair of rotatable support heads disposed in spaced relation for holding a pair of can bodies in opposed position, clamping jaws in each of said heads for tightly clamping together the side seam edges of a can body for retaining each body in place in its head, actuating means for rotating said support heads in synchronism along separate paths of travel and through a projected point of intersection of said paths of travel to bring the side seam edges of one can body closely adjacent the other, and electric means operable through said can bodies for establishing an electric welding arc directly between portions of said side seam edges of the two bodies as corresponding portions pass through the projected point of intersection of the paths of travel of said heads for simultaneously welding the seam edges of both bodies thereby producing two separate and independent welded can bodies.

3. In a machine for welding the side seam edges of tubular sheet metal can bodies, the combination of a pair of movable support heads disposed in spaced relation for holding a pair of can bodies in opposed position with their side seam edges extending toward each other when said heads are in predetermined positions, actuating means for moving said support heads along separate paths of travel to progressively advance all portions of the side seam edges of both can bodies through a projected point of intersection, electric means for passing an electric welding current through said bodies and between said corresponding portions of the side seam edges of the two bodies as they pass progressively through the projected point of intersection of the paths of travel of said heads for simultaneously welding the seam edges of both bodies, and means for controlling said welding current in accordance with the positions of the two bodies with respect to each other so that the welding current flows only while seam portions of both bodies are in said projected point of intersection.

4. In a machine for welding the side seam edges of tubular sheet metal can bodies, the combination of a pair of spaced and parallel rotatable shafts, means for rotating said shafts in synchronism and in opposite directions, a support arm mounted on each of said shafts and rotatable therewith, a support head carried on each arm and electrically insulated therefrom for holding a can body, the two bodies having their side seam edges extending beyond their respective heads and toward each other, said support heads having movement along separate curved paths of travel each centered on the axis of its respective actuating shaft and passing simultaneously through a welding station at a point of intersection of their projected paths of travel, a pair of electric contact brushes located adjacent the paths of travel of said heads for engagement with the heads while they are passing through said welding station, a source of electric welding current connecting with said brushes, electric switch means connecting with said brushes, and a cam secured to one of said support arms for opening and closing said switch in time with the passage of said bodies through said welding station for passing said electric welding current through said supports heads from the seam edges of one body to the seam edges of the opposing body to simultaneously weld the seam edges of both bodies thereby producing two separate independent welded bodies.

5. In a machine for welding the side seam edges of tubular sheet metal can bodies, the combination of a pair of horizontally spaced movable support heads for holding a pair of can bodies with the side seam edges of one body extending down and with the side seam edges of the other body extending up, means for vertically aligning said support heads with each other to dispose the side seam edges of both can bodies in the desired horizontal planes for proper cooperative welding action between the seam edges of the can bodies held in said heads when said edges are positioned for welding, actuating means for moving the aligned support heads in synchronism along separate paths of travel and through a projected point of intersection of said paths of travel, and electric means for establishing an electric welding arc between said side seam edges of the two bodies as portions of the seams pass through the projected point of intersection for simultaneously welding the seam edges of both bodies thereby producing two separate and independent welded can bodies.

6. In a machine for welding the side seam edges of tubular sheet metal can bodies, the combination of a pair of movable support heads disposed in spaced relation, clamping means on each head for holding the side seam edges of a can body closely together for welding, with the side seam edges of the two clamped bodies extending in opposite directions and facing each other, gauge means for each support head, each of said gauge means having a part engageable by the side seam edges of the body in the associated head for determining the position of the seam edges within its clamping means, actuating means for moving said support heads to convey the two held can bodies along separate paths of travel to pass their seams through a projected point of intersection of the paths, the extended side seam edges of one can body passing along and in close proximity to the side seam edges of the second can body at said point of intersection, the edges of one body being spaced from the other a distance determined by the gauged clamped positions of the seam edges within the heads, and electric means for welding progressively portions of the two side seam edges passing said projected point of intersection for progressively welding the entire side seams of both bodies.

7. In a machine for welding the side seam edges of tubular sheet metal can bodies, the combination of a pair of movable support heads disposed in spaced relation, clamping means on each head for holding the side seam edges of a can body closely together for welding, with the side seam edges of the two clamped bodies extending in opposite directions and facing each other, an electric contact shoe carried on each head adjacent its clamping means and electrically connected with its clamped can body, actuating means for moving said support heads to convey the two held can bodies along separate paths of travel to pass their seams through a projected point of intersection of the paths, the extended side seam edges of one can body passing the side seam edges of the second can body at said point of intersection, an electric means for engaging said contact shoes for establishing a flow of electric welding current between the side seam edges of the two can bodies at said projected point of intersection as portions of the seams progressively pass one another for welding the side seams of both bodies.

8. In a machine for welding seam portions of electrically conducting articles, the combination of holders for retaining such articles, means for moving said holders with the articles retained therein in separate paths, gauge means adjacent said paths for shifting the articles in said holders to locate the seam portions of the articles in one of said paths in close juxtaposition to the seam portions of articles in another of said paths, and electric means for passing a welding current through said articles to create a welding arc between the juxtaposed seam portions of the articles.

LYMAN L. JONES.
GEORGE K. BARGER.

REFERENCES CITED

The following references are of record in the file of this patent:

UNITED STATES PATENTS

| Number | Name | Date |
|---|---|---|
| 2,066,025 | Zublin et al. | Dec. 29, 1936 |
| 2,204,549 | Murch | June 18, 1940 |
| 2,412,166 | Mero et al. | Dec. 3, 1946 |
| 2,452,574 | Jones | Nov. 2, 1948 |

FOREIGN PATENTS

| Number | Country | Date |
|---|---|---|
| 380,397 | Great Britain | Sept. 15, 1932 |